Patented Aug. 4, 1936

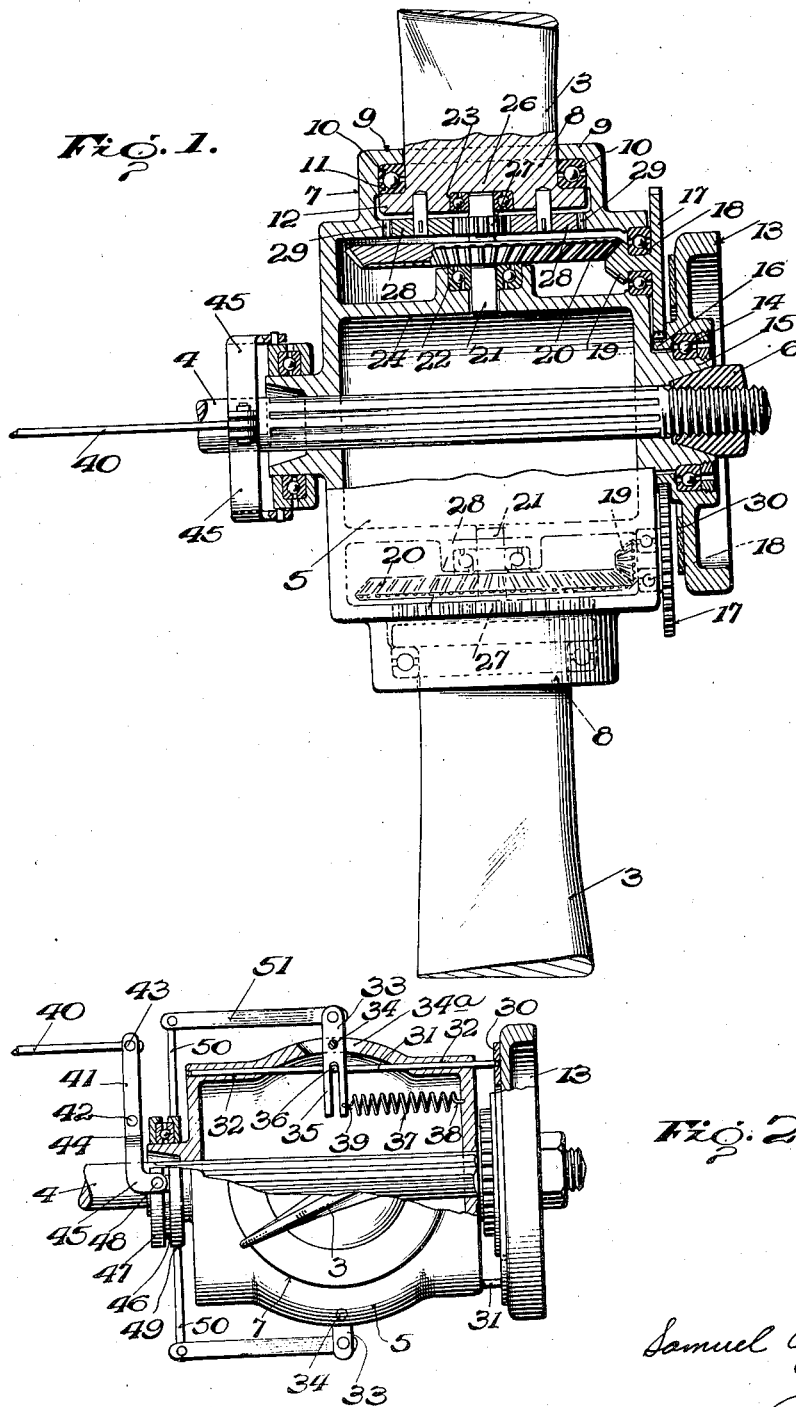

2,049,954

UNITED STATES PATENT OFFICE 2,049,954

VARIABLE PITCH PROPELLER

Samuel Gilbert, Verona, N. J., assignor to Eclipse Aviation Corporation, East Orange, N. J., a corporation of New Jersey Application September 5, 1934, Serial No. 742,793

10 Claims. (Cl. 170—162)

This invention relates to aircraft propellers, and more particularly to a propeller of the type wherein the pitch of the blades can be varied during operation.

One of the objects of the present invention is to provide novel means for varying the pitch of the blades of a propeller.

Another object is to provide means whereby force or power derived from the angular acceleration or deceleration of the propeller is employed to change the pitch of the propeller blades.

A further object is to provide in a variable pitch propeller of the above type, an inertia means for effecting a variation in the blade pitch.

A still further object is to provide means whereby the action of the inertia means may be readily controlled by an operator in a simple and efficient manner.

The above and other objects of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, wherein similar reference characters refer to similar parts throughout the several views:

Fig. 1 is an axial view, partly in section, of a propeller embodying the present invention, and Fig. 2 is a side view, partly in section, of the propeller shown in Fig. 1.

Referring to the drawing, a variable pitch propeller constructed in accordance with the principles of the present invention is illustrated therein as including a plurality of propeller blades 3, a portion only thereof being shown in order that a large scale drawing may be employed. The blades 3 are adapted to be driven by a rotatable driving shaft 4, which, in the case of an aircraft installation, may be a member drivably connected to the crank shaft of an internal combustion engine, and the pitch or angle of incidence of the blades 3 may be varied at the will of the pilot by means of force or energy derived from the angular acceleration or deceleration of the propeller.

The blades 3 are drivably and adjustably secured to a propeller shaft 4 by means of a hub 5 splined upon the shaft 4 and secured thereto by means of a coned nut 6. Each of the blades 3 is journalled, for adjustment about its longitudinal axis, in a socket portion 7 formed on the hub 5 and surrounding the shank 8 of the blade. This socket portion 7 is provided with an inwardly-extending overhanging flange 9 which retains one race 10 of a thrust ball bearing, the other race 11 of which engages a flange 12 formed on the root of the blade so as to retain the blade in position during rotation of the propeller while permitting the propeller blade to be easily adjusted about its longitudinal axis.

According to the present invention, the power utilized for changing the pitch of the propeller is derived from inertia means responsive to changes in angular velocity of the propeller and, as shown, comprises a flywheel 13 journalled coaxially with the propeller shaft upon a ball bearing 14 encircling an extension 15 formed on the forward end of the hub 5. Assuming that the propeller is revolving in a clockwise direction, looking from right to left, Fig. 1, if the speed of the propeller is suddenly increased the inertia of the flywheel 13 will tend to cause it to lag behind the motion of the propeller and thus to rotate counterclockwise with respect to the propeller. Conversely, any sudden decrease in angular speed of the propeller will tend to cause the flywheel 13 to run ahead of the motion of the propeller and to rotate clockwise with respect to the propeller. This relative rotation between the propeller and the flywheel 13 is utilized to change the pitch of the propeller, as will appear more fully hereinafter.

A gear train is interposed between the flywheel 13 and the propeller blades 3, whereby the above mentioned rotation of the flywheel 13 with respect to the propeller will effect an adjustment of the propeller blades about their longitudinal axes. Such gearing comprises a gear 16 formed integrally with the flywheel, gears 17 suitably journalled on ball bearings 18 mounted in the hub 5 and meshing with said gear 16, bevel pinions 19 integral with the gear 17, bevel gears 20 meshing with the respective bevel pinions 19, and keyed to shafts 21 journalled in ball bearings 22 and 23 mounted respectively on a web 24 extending across the hub casing 5 and on the root 26 of the propeller blade. A sun gear 27 is suitably secured to each shaft 21, and meshes with a plurality of planet gears 28, the latter being carried by the roots of the propeller blades and being in meshing relation with a fixed ring gear 29 formed in the hub casing 5. Viewing from right to left in Fig. 1, in the event the flywheel 13 rotates in a clockwise direction with respect to the hub 5, the gears 17 and bevel pinions 19 will rotate in a counterclockwise direction and, as seen in Fig. 1 when looking inward from each propeller blade 3 toward the propeller shaft, the bevel gears 20 will rotate in a clockwise direction, adjusting the propeller blades 3 also in a clockwise direction by means of the planetary gears 27, 28 and 29 so as to increase the pitch of the propeller. Conversely, relative rotation of the flywheel 13 in a counter-clockwise direction will, with respect to the hub 5, decrease the pitch of the propeller.

Braking means are provided for normally preventing any angular movement of the flywheel with respect to the hub and, as shown, comprise an annular brake shoe 30 thrust into engagement with the flywheel 13 by two rods 31 slidable longitudinally in the bores 32 in the hub 5. Each of the rods 31 is actuated by a lever 33 pivoted at 34 to the casing 5 and extending through a slot 34ª in said casing, said lever being provided with an arm 35 forked so as to embrace a pin 36 fixed on the rod 31. A tension spring 37 fastened to the hub casing 5 at 38 and to the lever 33 at 39 normally biases the lever 33 so as to shift the rod 31 forwardly and hold the brake shoe 30 in engagement with the flywheel 13.

Means are provided whereby an operator may disengage the brake 30 from the flywheel 13. As shown, such means comprises a pull rod 40 extending back to the pilot, a lever 41 pivoted at 42 to a stationary portion of the aeroplane and having an upper arm 43 actuated by the pull rod 40 and also a lower arm 44 forked into two portions 45, one on either side of the propeller shaft 4. A longitudinally shiftable thrust ball bearing 46 concentric with the propeller shaft is also provided, the race 47 thereof being non-rotating and provided with pintles 48 adapted to be engaged by the forked arms 45 of the lever 41. The other race 49 of the bearing 46 rotates with the propeller hub and is connected to the lever 33 by a suitable bar 50, one end of which is secured to the race 49, the other end being pivotally connected to a link 51 pivoted to the lever 33. As seen in Fig. 2, pulling rearwardly upon the rod 40 rocks the lever 41 counterclockwise and thrusts the ball bearing 46 and the bar 50 and the link 51 to the right. Such movement rocks the levers 33 in such a direction as to move the arms 35 rearwardly against the action of the springs 37, thus drawing the rods 31 rearwardly to retract the brake shoe 30 from engagement with the flywheel 13.

In normal operation the propeller rotates in a clockwise direction as seen from right to left in Fig. 1, and the brake 30 is applied to the flywheel 13 to render it ineffective to change the pitch of the propeller. Assuming that the pilot desires to increase the pitch of the propeller he first increases the speed of the propeller; second, pulls the rod 40 to release the brake 30, rendering the flywheel 13 effective to change the pitch of the propeller; third, suddenly decreases the speed of the propeller so that the flywheel 13 will be left rotating faster than the propeller hub 5 and will rotate clockwise with respect thereto, thereby increasing the pitch of the propeller as heretofore described; fourth, when the desired increase in pitch has been effected will release the rod 40, thus applying the brake 30 to prevent any further change in pitch.

Conversely, when the pilot wishes to decrease the pitch of the propeller he first decreases the speed of the propeller to idling speed; second, pulls the rod 40 to disengage the brake 30; third, suddenly increases the speed of the propeller, causing the flywheel 13 to rotate counterclockwise with respect to the propeller so as to decrease the pitch of the blades thereof; and fourth, when the desired decrease in pitch has been obtained, will release the rod 40 so as to reengage the brake 30 and prevent further change in pitch.

The pitch of the propeller may also be decreased more slowly by merely pulling on the rod 40 to release the brake 30. As is well known, the centrifugal and reaction forces on the propeller blades 3 exert a torque tending to reduce their pitch. This torque will twist the blades 3 to a low-pitch position, this motion being regulated and restrained by the inertia of the flywheel 13, which is rotated with respect to the propeller hub by this operation.

While there has been shown and described only one form of the invention, it is to be expressly understood that the same is not limited thereto but may be embodied in various mechanical modifications. Various other changes may be made in the details of construction and arrangement of parts as well known by those skilled in the art without departing from the spirit of the invention. Reference will therefore be had to the appended claims for a definition of the limits of the invention.

What is claimed is:

1. The combination, with a variable pitch propeller, of means for changing the pitch of said propeller comprising an inertia member journalled upon said propeller about an axis passing through the center of gravity of said member, and manually-operable means for controlling the operation of said member.

2. The combination, with a variable pitch propeller, of means for changing the pitch of said propeller comprising an inertia member journalled upon said variable pitch propeller coaxially therewith, and manually-operable means for controlling the operation of said member.

3. The combination, with a variable pitch propeller having a hub, of means for changing the pitch of said propeller including an inertia member journalled upon said propeller about an axis passing through the center of gravity of said member, and means shiftable to prevent relative movement between said member and said hub.

4. The combination, with a variable pitch propeller, of means for changing the pitch of said propeller including an inertia member journalled upon said propeller coaxially therewith, and means shiftable to prevent relative movement between said member and propeller.

5. The combination, with a variable pitch propeller, of means for changing the pitch of said propeller including an inertia member journalled upon said propeller about an axis passing through the center of gravity of said member, and braking means shiftable to prevent relative movement between said inertia member and said propeller.

6. The combination, with a variable pitch propeller, of means for changing the pitch of said propeller including an inertia member journalled upon said propeller coaxially therewith, and braking means shiftable to prevent relative movement between said inertia weight and said hub.

7. The method of transmitting power to an element carried on a moving member comprising coupling an acceleration-resisting member to said moving member so as to cause the two members to move together, uncoupling the acceleration-resisting member from said moving member, changing the speed of the moving member so as to cause relative motion of the acceleration-resisting member with respect to the moving member and applying to said element carried on the moving member the power derived from said relative movement.

8. The combination, with a variable pitch propeller, of means for changing the pitch of said propeller including an inertia member journalled upon said propeller about an axis passing through the center of gravity of said member, braking means carried by the propeller and normally engaging said member to prevent rotation thereof with respect to the propeller, and means for disengaging said braking means from the member.

9. The combination, with a variable pitch propeller, of means for changing the pitch of said propeller including an inertia member journalled upon said propeller coaxially therewith, braking means carried by the propeller and normally engaging the member to prevent rotation thereof with respect to the propeller, and means for disengaging said braking means from the member.

10. A variable pitch propeller comprising a hub, a propeller blade adjustably mounted in said hub, and means for adjusting said propeller blade with respect to said hub comprising an inertia weight journalled coaxially with said hub, a connection between said inertia weight and said propeller blade, and manually-operable means for controlling the operation of said weight.

SAMUEL GILBERT.